Aug. 11, 1953

K. H. BAIGENT 2,648,096

INJECTION MOLDING MACHINE AND VARIABLE
DELIVERY HYDRAULIC PUMP THEREFOR

Filed Oct. 31, 1951

Inventor
Keith Herbert Baigent
By Moses, Nolte, Crews + Berry
Attorneys

Aug. 11, 1953 K. H. BAIGENT 2,648,096
INJECTION MOLDING MACHINE AND VARIABLE
DELIVERY HYDRAULIC PUMP THEREFOR
Filed Oct. 31, 1951 6 Sheets-Sheet 2

INVENTOR
Keith Herbert Baigent
By Mones, Nolte, Crews & Berry
Attorneys

Aug. 11, 1953  K. H. BAIGENT  2,648,096
INJECTION MOLDING MACHINE AND VARIABLE
DELIVERY HYDRAULIC PUMP THEREFOR
Filed Oct. 31, 1951  6 Sheets-Sheet 3

Inventor
Keith Herbert Baigent
By Moses, Nolte, Crews & Berry
Attorneys

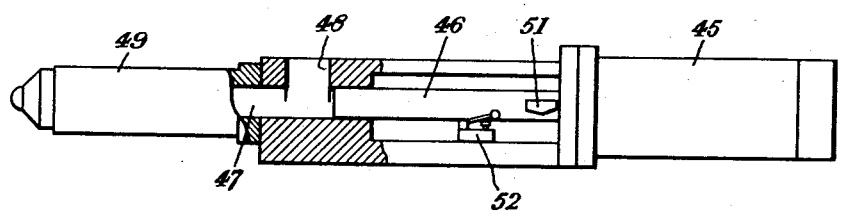
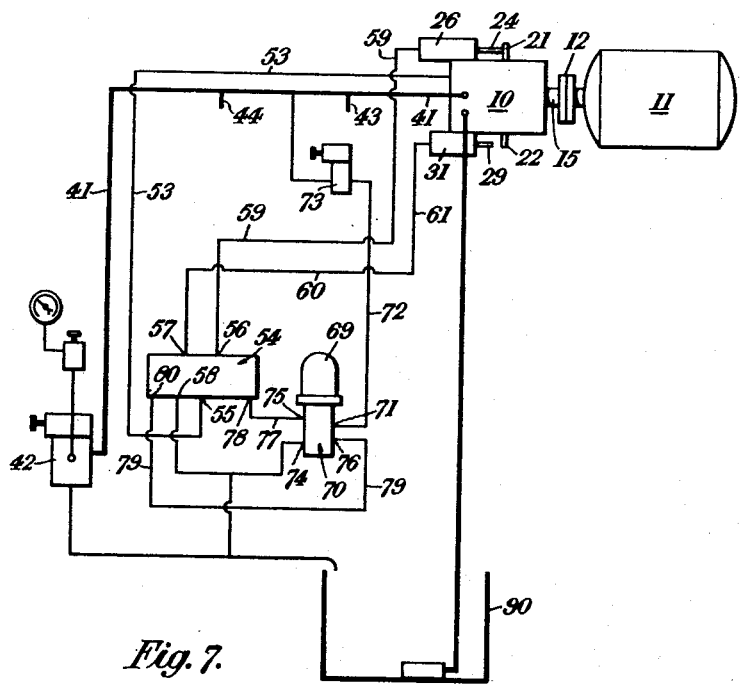

Aug. 11, 1953  K. H. BAIGENT  2,648,096
INJECTION MOLDING MACHINE AND VARIABLE
DELIVERY HYDRAULIC PUMP THEREFOR
Filed Oct. 31, 1951  6 Sheets-Sheet 6

Inventor
Keith Herbert Baigent
By Moses, Nolte, Crews & Berry
Attorneys

UNITED STATES PATENT OFFICE 2,648,096

INJECTION MOLDING MACHINE AND VARIABLE DELIVERY HYDRAULIC PUMP THEREFOR

Keith Herbert Baigent, West Ewell, England, assignor to R. H. Windsor Limited, London, England Application October 31, 1951, Serial No. 254,159
In Great Britain November 20, 1950

7 Claims. (Cl. 18—30)

Injection moulding machines are known in which both the mechanism for opening and closing the platens and the injection plunger are hydraulically operated. It is a desideratum that, during their closing movement, the platens should first move rapidly but that the movement should terminate in a gentle squeezing action under high pressure as the platens meet while, on opening of the platens, they should initially move slowly under high pressure to break the toggle mechanism which holds them closed and should thereafter move rapidly to the open position. The injection plunger should move rapidly over about the first half of its injection stroke, but thereafter the injection of material into the mould should be regulated both with regard to pressure and volume. On the return stroke, the requirement is that the injection plunger should move as rapidly as possible until the buffer comes into operation to arrest it.

All these requirements, except that in regard to the second half of the injection stroke of the plunger, are met by employing a variable delivery hydraulic pump of the type comprising a spring loaded or otherwise biased piston coupled to the delivery-control mechanism and subject to the delivery pressure of the pump, the arrangement being such that the pump will operate at maximum delivery until the delivery pressure rises to a value sufficient to displace the piston against the biasing force acting thereon, whereafter the piston will operate to reduce the delivery of the pump progressively to zero as the delivery pressure increases further.

To cater for control of the pressure and volume at which the material is injected during the second part of the delivery stroke of the injection plunger, various forms of booster device have been proposed. These all, however, involve the use of a flow control valve, with the result that the motor driving the pump is operating at full power despite the fact that a fraction only of the delivery of the pump is being used to operate the injection plunger.

The invention provides a variable delivery hydraulic pump of the above type, particularly though not exclusively for use with an injection moulding machine, comprising a second piston coacting with the delivery-control mechanism, a change-over valve movable from a normal position, in which the biased piston is subjected to the delivery pressure of the pump and the second piston is connected to exhaust, to an alternative position in which the biased piston is relieved of pressure and hydraulic pressure is applied to the second piston, and a stop for then arresting the second piston in a predetermined position in which the delivery-control mechanism is set to give a predetermined delivery. Preferably the stop associated with the second piston is adjustable, to vary the delivery given by the pump when the change-over valve is in its alternative position. This form of pump has the advantage, when used to provide boost in an injection moulding machine, that the prime mover driving the pump will operate at reduced power, related to its reduced output, when the delivery of the pump is reduced during the second portion of the injection stroke of the plunger.

One form of pump according to the invention, as utilised in an injection moulding machine, will now be described in detail, by way of example, with reference to the accompanying drawings, in which—

Figure 5:
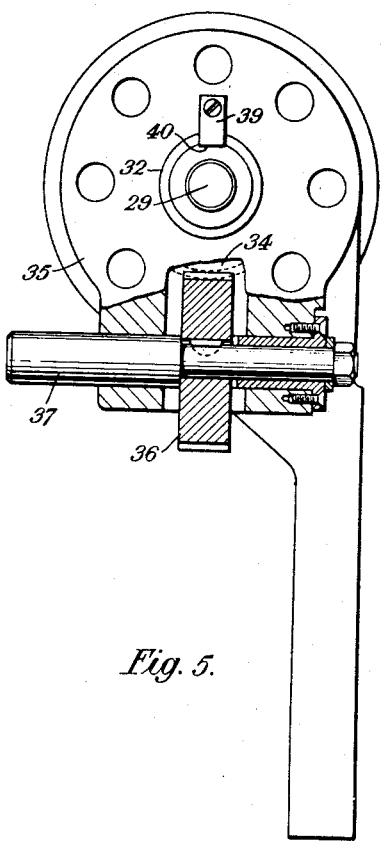
Figure 4:
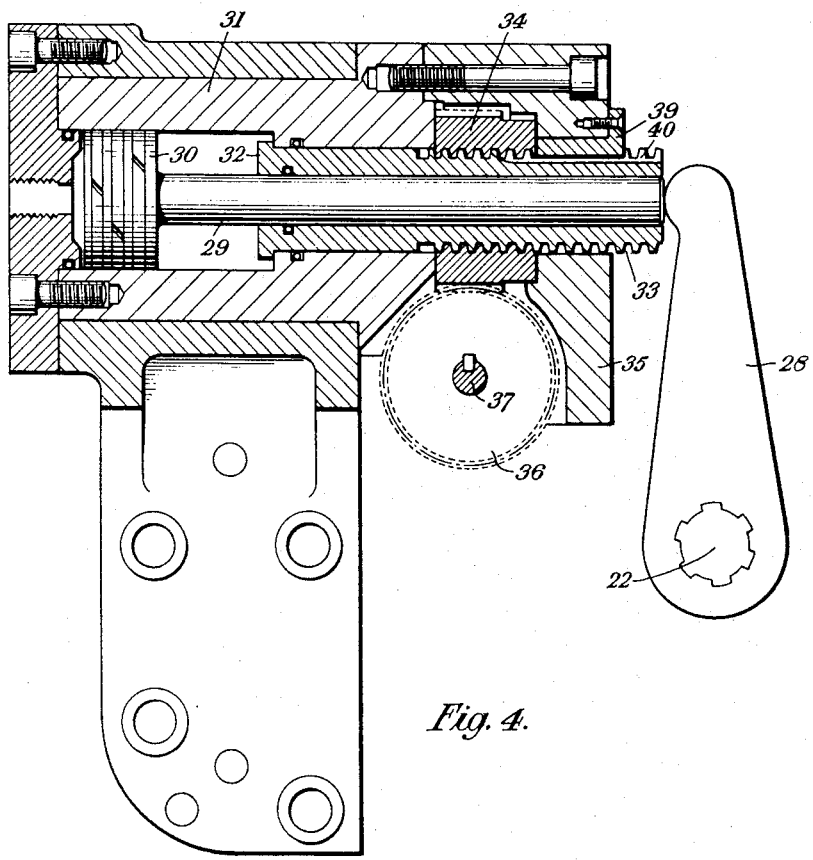
Figure 9:
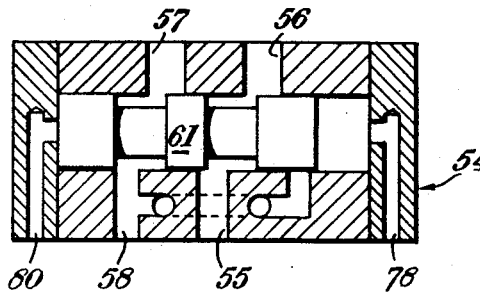
Figure 10:
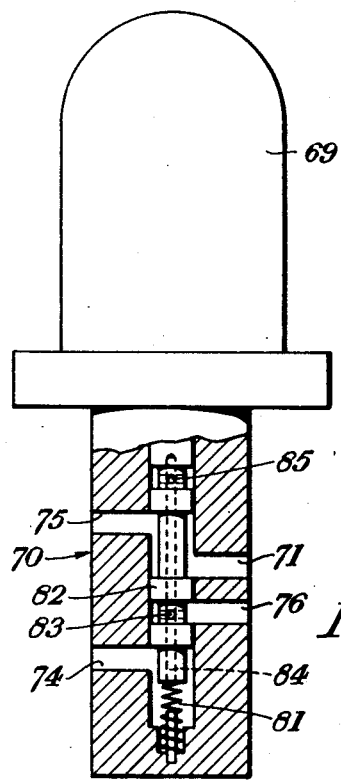
Figure 8:
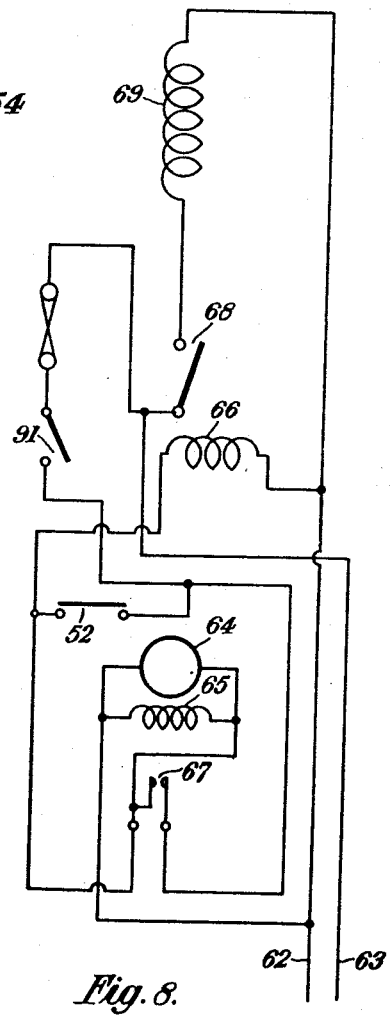

Fig. 4 is a section, on a larger scale, through the constant volume control cylinder of the pump, Fig. 5 is an end elevation, partly in section, looking from the right hand end of Fig. 4, Fig. 6 is a diagrammatic view of the injection cylinder and associated limit switch, Fig. 7 is a hydraulic circuit diagram, Fig. 8 is an electrical circuit diagram, Fig. 9 is a section through the change-over valve, and Fig. 10 is a section through the associated pilot valve.

Like reference numerals indicate like parts throughout the figures.

Figure 3:
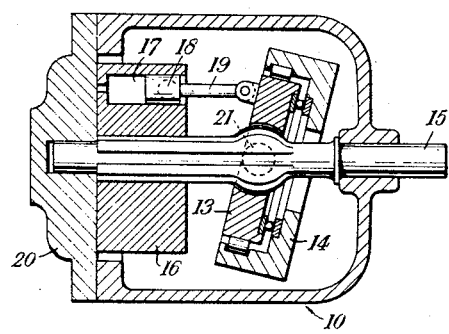
Fig. 3 is a diagrammatic longitudinal section through the pump.

The variable delivery pump 10, which is driven by an electric motor 11 (Fig. 7) through a flexible coupling 12, is of the swash plate type. As shown diagrammatically in Fig. 3, the swash plate 13, which is mounted for rotation in a tilting box 14, is driven by a pump shaft 15. Also driven by the shaft 15 is a cylinder block 16, containing a number of cylinders, one of which only is shown at 17 in Fig. 3. In each cylinder is a piston 18, coupled to the swash plate by a piston rod 19. The cylinder block 16 coacts in known fashion with a fixed valve plate 20, containing two kidney shaped ports (not shown) one communicating with the inlet of the pump and the other with its outlet. The tilting box 14 is mounted on trunnions 21, 22 about which it is rotatable for the purpose of varying the angular setting of the swash plate and therefore the delivery of the pump.

Figure 1:
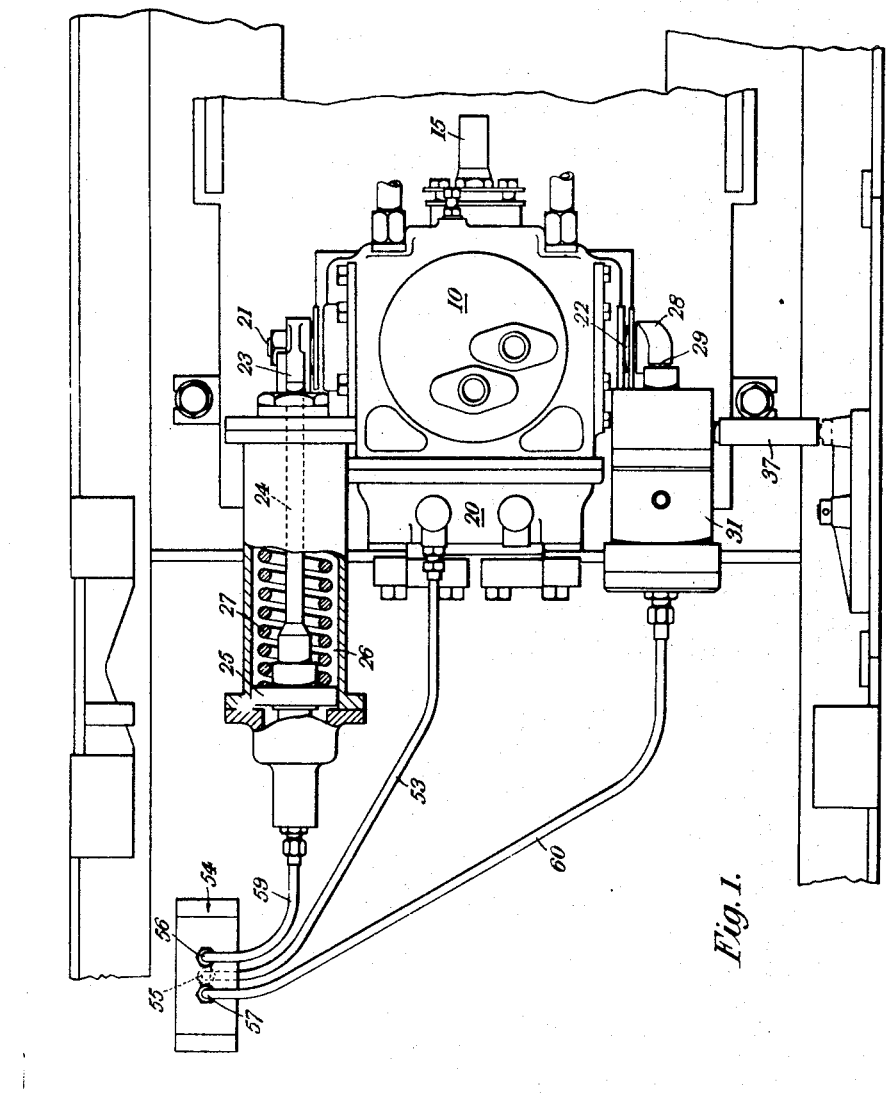
Fig. 1 is a plan view of the pump.
Figure 2:
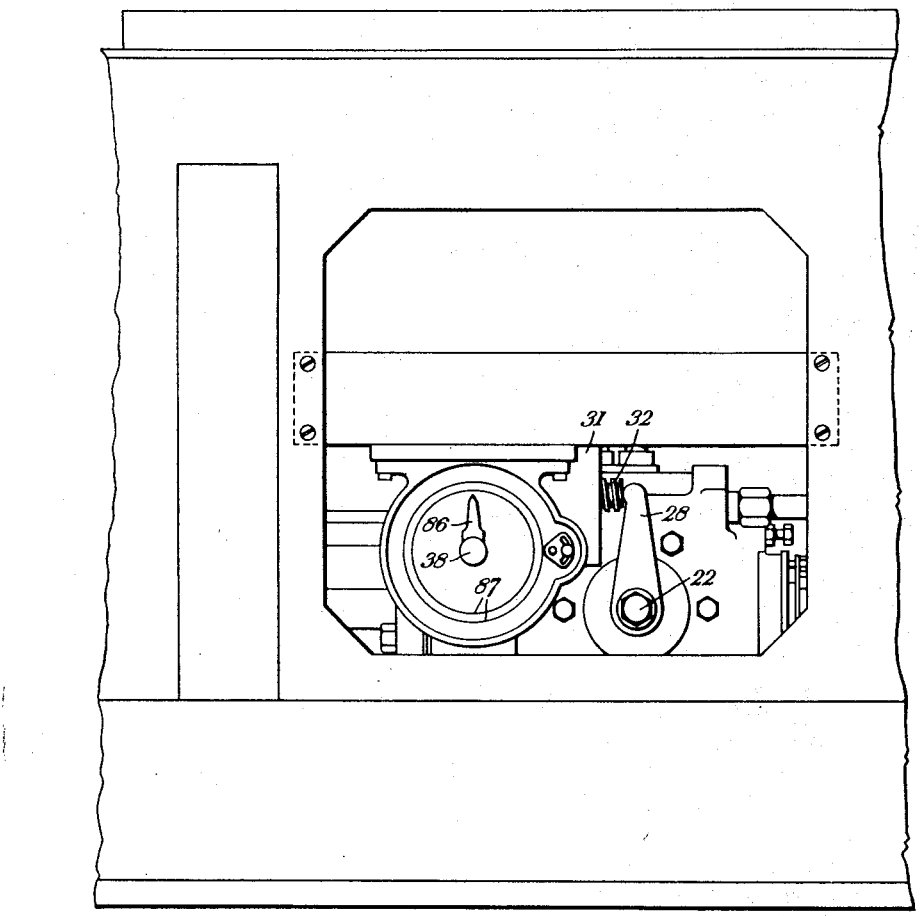
Fig. 2 is a corresponding side elevation.

One trunnion 21 (Fig. 1) carries an arm 23 pivoted to the rod 24 of a piston 25 disposed in a cylinder 26 and loaded by a spring 27. The piston 25 is normally subject to the delivery pressure of the pump. The other trunnion 22 (see also Figs. 2 and 4) carries an arm 28 which bears against the rod 29 of a second piston 30. The piston 30 is accommodated in a constant volume control cylinder 31 and its rod 29 is movable in a regulating sleeve 32. A thread 33 on the exterior of the sleeve 32 engages a thread on a gear wheel 34, which is held against axial movement, between the cylinder 31 and a member 35, and which meshes with a gear wheel 36 on an adjusting shaft 37 extending transversely to the piston rod. The shaft 37 is geared, by gearing not shown, to an adjusting knob 38 (Fig. 2) whereby the shaft 37 can be rotated to effect axial movement of the sleeve 32. A key 39 (Fig. 4) engages a keyway 40 in the sleeve 32, so preventing the sleeve from rotating. The left hand end of the sleeve 32 constitutes an adjustable stop which coacts with the piston 30 to limit its stroke.

The pump 10, which draws liquid from a reservoir 90, supplies liquid under pressure to a delivery line 41 (Fig. 7), fitted with a pressure regulating valve 42, to hydraulic cylinders for opening and closing the dies of an injection moulding machine and for actuating the injection plunger. These cylinders communicate with the delivery line 41 through lines, 43, 44 respectively, fitted with valves (not shown) which are operated periodically in known fashion, first to close the dies, then to cause the injection plunger to inject plasticized moulding powder into the dies, then to retract the injection plunger and finally to open the dies. These parts being conventional are not shown in detail. Fig. 6 however shows the hydraulic cylinder 45 for operating the injection plunger 46. The plunger 46 works in an injection cylinder 47, having an opening 48 for the supply thereto of moulding powder from a hopper, and operates periodically to force a charge of compressed moulding powder into a plasticizing chamber 49 communicating with the injection nozzle 50 of the machine. The injection plunger 46 carries a cam 51 for operating a limit switch 52, the purpose of which will be explained later.

A pipe 53 (Figs. 1 and 7) supplies liquid at the delivery pressure of the pump to a change over valve 54. This valve (see also Fig. 9) has a pressure inlet 55 and outlets 56, 57, 58. The outlet 56 communicates, via a pipe 59, with the cylinder 26, the outlet 57 communicates, via a pipe 60, with the cylinder 31 and the outlet 58 is an exhaust outlet.

Normally the spool 61 of the valve 54 occupies the position shown in Fig. 9, in which the outlet 56, and therefore the cylinder 26, are subjected to pressure and the outlet 57, and therefore the cylinder 31, are connected to exhaust. The spring-loaded piston 25 therefore automatically controls the pump delivery. The swash plate 13 will initially be set to its maximum delivery position by the spring 27, the arm 28 then holding the piston 30 in the position shown in Fig. 4. When the pump delivery pressure rises above a given limit the piston 25 will be forced back to reduce the inclination of the swash plate, and therefore the delivery of the pump, the arm 28 moving away from the piston rod 29.

About half way through the delivery stroke of the injection plunger 46 the cam 51 will momentarily close the limit switch 52. This, assuming the boost isolator switch 91 (Fig. 8) to be closed, completes a circuit between supply lines 62, 63 to energize an adjustable time switch 64 and coils 65, 66. The contacts 67 of the coil 65 then close to complete a holding circuit for the coils 65, 66 and the contacts 68 of the coil 66 close to energize a solenoid 69.

The solenoid 69 is associated with a pilot valve 70, details of which are shown in Fig. 10. This has an inlet port 71, communicating with the pump delivery line 41 (Fig. 7) by a line 72 containing a pressure reducing valve 73. The valve 70 also has three outlet ports 74, 75, 76. The port 74 is an exhaust outlet port, the port 75 comunicates, via line 77, with a port 78 in the change-over valve 54, and the port 76 communicates, via a line 79, with a port 80 in the change over valve 54.

When the solenoid 69 is de-energised, a spring 81 holds the spool 82 of the pilot valve 70 in the position shown in Fig. 10. Pressure is then supplied from the inlet port 71 of the pilot valve to its outlet port 75 and therefore to the port 78 of the change-over valve. The port 76 of the pilot valve, and therefore the port 80 of the change-over valve is then connected to exhaust through a port 83 and a central hole 84 in the valve spool 82. The spool 61 of the change-over valve is therefore held in the position shown in Fig. 9.

As soon, however, as the solenoid 69 is energised, the spool 82 of the pilot valve is depressed against the spring 81, from the position shown in Fig. 10. The pressure inlet 71 of the pilot valve is then connected to the port 76, and therefore to the port 80 of the change-over valve while the port 75 of the pilot valve, and consequently also the port 78 of the change-over valve, are then connected to exhaust via a port 85 in the valve spool and the central hole 84 therein. Consequently the change-over valve spool 61 is shifted to the right from the position shown in Fig. 9, thereby supplying pressure to the port 57 and cylinder 31 and connecting to exhaust the port 56 and cylinder 26. The piston 30 (Fig. 4) then moves until arrested by the sleeve 32 and so sets the swash-plate 13 at a position determined by the position of the sleeve 32. As previously explained, this sleeve is set by rotating the adjusting shaft 37 by means of the knob 38. The knob 38 also actuates a dial pointer 86 (Fig. 2) which indicates on scales 87 actual time in seconds to be taken by the second half of the injection stroke, to which boost time is set, and also indicates inches per minute of the plunger on boost. The pump thereafter delivers at constant volume for the remainder of the injection stroke and also for a subsequent period of dwell. After the end of this period, the time switch 64 (Fig. 8) positively opens the contacts 67, thereby de-energising the coils 65, 66, opening the contacts 68 and de-energising the solenoid 65. The pilot valve 70 and change-over valve 54 then revert to the positions shown in Figs. 10 and 7 respectively, with the result that the spring-loaded piston 25 assumes control over the swash-plate 13 for the remainder of the machine cycle and until the limit switch 52 is again operated on the forward stroke of the injection plunger 46 during the next machine cycle. Operation of the limit switch 52 on the return stroke of the injection plunger 46 is not effective to energise the solenoid 69 because at this time other circuits, not shown, are made and prevent closure of the limit switch from energising the coil 66.

It will be understood that, if desired, movement of the change-over valve 54 to its alternative position may be arranged to connect the cylinder 31 to a source of pressure other than the delivery line of the pump.

In accordance with known practice the injection stroke of the plunger 46 is initiated by a solenoid controlling a valve associated with the hydraulic mechanism controlling the plunger. This solenoid then frees an auxiliary pressure-regulating valve, which, when so freed, will open at a lower delivery pressure than the relief valve 42 of the pump, and is effective to prevent the delivery pressure of the pump exceeding a given limit during the second half of the injection stroke and the succeeding period of dwell. This auxiliary pressure-regulating valve is rendered inoperative prior to the return stroke of the plunger. These parts, which operate in known fashion, are not illustrated.

It will be appreciated that the change-over valve 54 may, if desired, be arranged to control a plurality of hydraulic pumps. In its normal position the valve would then supply pressure to the spring-loaded pistons of all the pumps and, when it moves to its alternative position, it would deprive the spring-loaded pistons of pressure and apply pressure to the second pistons of the pumps.

What I claim as my invention and desire to secure by Letters Patent is:

1. A variable delivery hydraulic pump comprising a swash plate for controlling the delivery of the pump, trunnions supporting said swash plate, a piston coupled to one of said trunnions and subject to the delivery pressure of the pump, said piston being effective in response to increase in said delivery pressure, to move the swash plate in the direction to reduce the delivery of the pump, a spring acting on said piston in opposition to said delivery pressure, a second piston coupled to the other trunnion, a change-over valve movable from a normal position in which the spring-loaded piston is subjected to the delivery pressure of the pump and the second piston is connected to exhaust, to an alternative position in which the pressure and exhaust connections to the two pistons are reversed, and a stop for them arresting said second piston in a predetermined position in which the swash plate is set to give a predetermined delivery.

2. A variable delivery hydraulic pump, comprising mechanism for controlling the delivery of the pump, a first cylinder, a piston in said first cylinder, a first conduit communicating with said first cylinder for normally subjecting said piston to the delivery pressure of the pump, means coupling said piston to said delivery controlling mechanism, means coacting with and biasing said piston against said delivery pressure and operative to maintain said mechanism in the position corresponding to maximum delivery of the pump so long as the delivery pressure is less than the biasing force acting on said piston and thereafter operative to reduce the delivery of the pump progressively with increase in the delivery pressure, a second cylinder, a second piston in said second cylinder, means coupling said second piston to said delivery controlling mechanism, a second conduit communicating with said second cylinder and normally connected to exhaust, a change-over valve having ports communicating with said conduits and movable from a normal position, in which the first cylinder is supplied through said first conduit with liquid at the delivery pressure of the pump and the second cylinder is connected by said second conduit to exhaust, to an alternative position in which the supply through said first conduit of liquid under pressure is cut off from the first cylinder and hydraulic pressure is supplied through said second conduit to the second cylinder, and a stop positioned to arrest the second piston, on movement thereof in response to supply of pressure to said second cylinder, in a predetermined position, said second piston then maintaining said delivery controlling mechanism in position to give a predetermined constant delivery.

3. A variable delivery hydraulic pump, comprising mechanism for controlling the delivery of the pump, a first cylinder, a piston in said first cylinder, a first conduit communicating with said first cylinder for normally subjecting said piston to the delivery pressure of the pump, means coupling said piston to said delivery controlling mechanism, means coacting with and biasing said piston against said delivery pressure and operative to maintain said mechanism in the position corresponding to maximum delivery of the pump so long as the delivery pressure is less than the biasing force acting on said piston and thereafter operative to reduce the delivery of the pump progressively with increase in the delivery pressure, a second cylinder, a second piston in said second cylinder, means coupling said second piston to said delivery controlling mechanism, a second conduit communicating with said second cylinder and normally connected to exhaust, a change-over valve having ports communicating with said conduits and movable from a normal position, in which the first cylinder is supplied through said first conduit with liquid at the delivery pressure of the pump and the second cylinder is connected through said second conduit to exhaust, to an alternative position in which the pressure and exhaust connections to said conduits are reversed, and a stop positioned to arrest the second piston, on movement thereof in response to supply of pressure to said second cylinder, in a predetermined position, said second piston then maintaining said delivery controlling mechanism in position to give a predetermined constant delivery.

4. A variable delivery hydraulic pump, comprising mechanism for controlling the delivery of the pump, a first cylinder, a piston in said first cylinder, a first conduit communicating with said first cylinder for normally subjecting said piston to the delivery pressure of the pump, means coupling said piston to said delivery controlling mechanism, a spring biasing said piston against said delivery pressure and operative to maintain said mechanism in the position corresponding to maximum delivery of the pump so long as the delivery pressure is less than the biasing force of said spring acting on said piston and thereafter operative to reduce the delivery of the pump progressively with increase in the delivery pressure, a second cylinder, a second piston in said second cylinder, means coupling said second piston to said delivery controlling mechanism, a second conduit communicating with said second cylinder and normally connected to exhaust, a change-over valve having ports communicating with said conduits and movable from a normal position, in which the first cylinder is supplied with liquid through said first conduit at the delivery pressure of the pump and the second cylinder is connected through said second conduit to exhaust, to an alternative position in which the supply through said first conduit of liquid under pressure is cut off from the first cylinder and hydraulic pressure is supplied through said second conduit to the second cylinder, and an adjustable stop positioned to arrest the second piston, on movement thereof in response to supply of pressure to said second cylinder, in a predetermined position, said second piston then maintaining said delivery controlling mechanism in position to give a predetermined constant delivery.

5. In an injection moulding machine, comprising an injection plunger and a hydraulic cylinder for actuating said injection plunger, the combination with said cylinder of a variable delivery hydraulic pump arranged to supply said cylinder with liquid to impart an injection stroke to said plunger, said pump comprising mechanism for controlling the delivery of the pump, a first cylinder, a piston in said first cylinder, a first conduit communicating with said first cylinder for normally subjecting said piston to the delivery pressure of the pump, means coupling said piston to said delivery controlling mechanism, means coacting with and biasing said piston against said delivery pressure and operative to maintain said mechanism in the position corresponding to maximum delivery of the pump so long as the delivery pressure is less than the biasing force acting on said piston and thereafter operative to reduce the delivery of the pump progressively with increase in the delivery pressure, a second cylinder, a second piston in said second cylinder, means coupling said second piston to said delivery controlling mechanism, a second conduit communicating with said second cylinder and normally connected to exhaust, a change-over valve having ports communicating with said conduits and movable from a normal position, in which the first cylinder is supplied through said first conduit with liquid at the delivery pressure of the pump and the second cylinder is connected through said second conduit to exhaust, to an alternative position in which the supply through said first conduit of liquid under pressure is cut off from the first cylinder and hydraulic pressure is supplied through said second conduit to the second cylinder, and a stop positioned to arrest the second piston, on movement thereof in response to supply of pressure to said second cylinder, in a predetermined position, said second piston then maintaining said delivery controlling mechanism in position to give a predetermined constant delivery, a limit switch coacting with said plunger and arranged to be actuated thereby approximately midway in its injection stroke, and electromagnetic means controlled by the limit switch for moving said change-over valve to its alternative position on actuation of said limit switch.

6. In an injection moulding machine, a combination as claimed in claim 5, wherein said electromagnetic means includes a solenoid controlled by the limit switch and a pilot valve controlled by the solenoid for effecting alternative pressure and exhaust connections to the change-over valve and thereby controlling its movement between its normal and alternative positions.

7. In an injection moulding machine, a combination as claimed in claim 6, wherein said electromagnetic means also includes an adjustable time switch coacting with the solenoid and operative to effect reversion of the change-over valve to normal position at a predetermined time after actuation of the limit switch.

KEITH HERBERT BAIGENT.

References Cited in the file of this patent

UNITED STATES PATENTS

| Number | Name | Date |
| --- | --- | --- |
| 2,114,445 | Gros | Apr. 19, 1938 |
| 2,273,468 | Ferris | Feb. 17, 1942 |
| 2,333,601 | Tucker | Nov. 2, 1943 |
| 2,356,101 | Temple | Aug. 15, 1944 |
| 2,406,138 | Ferris et al. | Aug. 20, 1946 |
| 2,409,185 | Blasutta | Oct. 15, 1946 |
| 2,494,071 | Veale | Jan. 10, 1950 |
| 2,550,966 | Buchanan | May 1, 1951 |